(12) United States Patent
Greenwood

(10) Patent No.: US 9,558,136 B2
(45) Date of Patent: Jan. 31, 2017

(54) VARIABLE SERIES RESISTANCE TERMINATION FOR WIRELINE SERIAL LINK TRANSISTOR

(71) Applicant: Advanced Micro Devices, Inc., Sunnyvale, CA (US)

(72) Inventor: Stephen F. Greenwood, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 174 days.

(21) Appl. No.: 13/946,350

(22) Filed: Jul. 19, 2013

(65) Prior Publication Data

US 2015/0022234 A1 Jan. 22, 2015

(51) Int. Cl.
*G06F 13/40* (2006.01)
*G06F 13/38* (2006.01)

(52) U.S. Cl.
CPC ............. *G06F 13/40* (2013.01); *G06F 13/385* (2013.01)

(58) Field of Classification Search
CPC ............. H04L 25/0278; H04L 25/0298; H04L 25/028; H04L 25/0272; H04L 25/085; H04L 25/0292; H04L 25/03343; H04L 25/0288; H04L 25/292; H03K 19/0005; H03K 17/164; H03K 19/018585; H03K 19/018557; H03K 17/145; H03K 19/00384; H03K 19/0027; H03K 19/086; H03K 19/00376; H03K 19/00361; H03K 19/00346; H03K 19/09429; H03K 19/01721; H03K 17/16; H03K 17/163; G06F 13/4086

USPC ......... 326/26, 30, 81–83, 86–87, 27, 31, 32; 327/108–109
See application file for complete search history.

(56) References Cited

U.S. PATENT DOCUMENTS

| | | | | |
|---|---|---|---|---|
| 7,135,884 B1* | 11/2006 | Talbot | ................ | H03K 17/164 326/30 |
| 7,227,382 B1* | 6/2007 | Talbot | ............... | H03K 19/0005 326/83 |
| 7,525,338 B2* | 4/2009 | Nguyen | ............ | H03K 19/0005 326/27 |
| 8,085,061 B2* | 12/2011 | Kinoshita | ........... | G11C 7/1051 326/30 |
| 2005/0040845 A1* | 2/2005 | Park | ................... | H03K 19/0005 326/30 |
| 2006/0261844 A1* | 11/2006 | Kim | ................... | H03K 19/0005 326/30 |
| 2011/0026334 A1* | 2/2011 | Bae | ...................... | G11C 7/1051 365/189.11 |
| 2014/0184523 A1* | 7/2014 | McCall | ............. | H03K 19/0005 345/173 |

\* cited by examiner

Primary Examiner — Alexander H Taningco
Assistant Examiner — Seokjin Kim

(57) ABSTRACT

A variable series resistance termination circuit for wireline serial link transceivers is provided. Some embodiments include a pad for coupling to a wireline serial link and a termination circuit. The termination circuit includes a plurality of resistive components coupled in series with the pad and a plurality of switches. Each switch is to couple one or more of the plurality of resistive components in series between the pad and a termination voltage node when the switch is closed. A subset of the plurality of switches can be selectively closed to establish a resistive component of an impedance of the termination circuit.

20 Claims, 7 Drawing Sheets

VARIABLE SERIES RESISTANCE TERMINATION FOR WIRELINE SERIAL LINK TRANSISTOR

BACKGROUND

Field of the Disclosure

The present disclosure relates generally to integrated circuits and, more particularly, to wireline serial link transceivers in integrated circuits.

Description of the Related Art

High-speed wireline serial links may be used to interconnect portions of an integrated circuit. For example, wireline serial links may be used to connect processing devices, such as central processing units (CPUs), graphics processing units (GPUs), or accelerated processing units (APUs), to other processing devices, memory elements, or other circuits. These integrated circuit components therefore may include transmitters or receivers for transmitting or receiving information over the wireline serial link. Signals transmitted from a transmitter to a receiver over a high-speed wireline serial link may be degraded by imperfect return loss caused by reflection of a portion of the signal at a discontinuity such as an impedance mismatch between the transmitter and the receiver. At higher frequencies, degradation in return loss caused by reflections is primarily caused by the capacitive component of the port impedance at the transmitter.

Channel equalization is typically performed in conventional high-speed serial link transmitters using a digital finite impulse response (FIR) filter that is implemented using a plurality of resistive components that are deployed in parallel with each other. Conventional high-speed serial link transmitters also typically implement a resistive tuning circuit to optimize the resistive component of the output impedance to reduce return losses. In practice, the resistive tuning circuit is implemented using the same resistive components as those used to implement the FIR filter, e.g., by including a transistor that can be turned on or off to add or remove the resistors from the parallel circuit. The presence of these transistors incurs a parasitic capacitance, which increases the high-frequency return loss and degrades the transmitted signal.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF EMBODIMENTS

Figure 1:
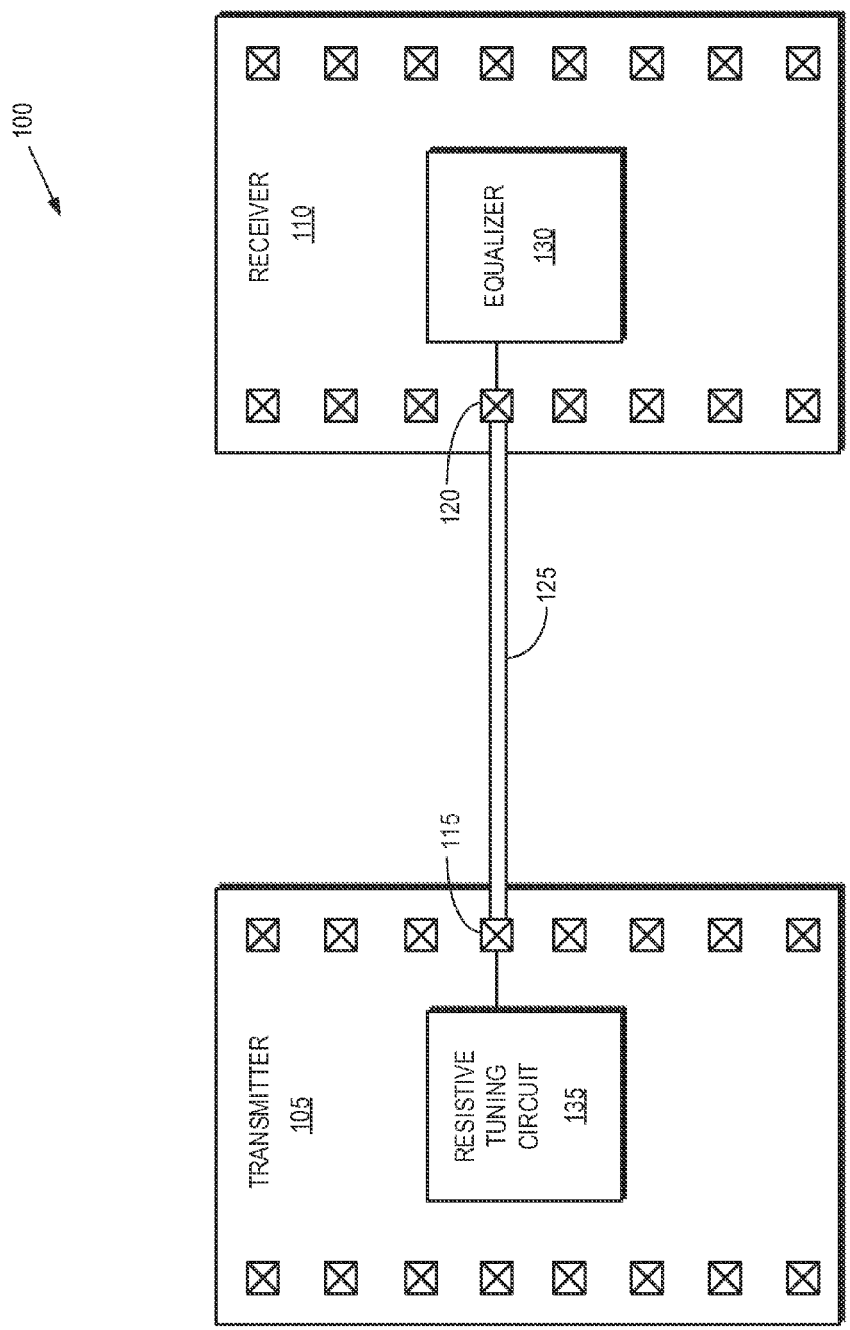
FIG. 1 is a block diagram of an integrated circuit including a transmitter and a receiver in accordance with some embodiments.

FIGS. 1-6 describe embodiments of a resistive tuning circuit that may be implemented in a transmitter or a receiver that communicates over a wireline serial link and which may exhibit reduced parasitic capacitance. The resistive tuning circuit includes a termination circuit formed of a plurality of resistive components such as one or more resistors coupled in series to reduce the capacitive component of the impedance of the transmitter or receiver. Some embodiments of the termination circuit are implemented using a plurality of resistive components that can be selectively coupled in series between a termination voltage node and a pad that is configured to be coupled to the wireline serial link. The resistive component of the impedance can be varied by selectively coupling more or fewer of the resistive components in series between the termination voltage node and the pad. The capacitive component of the impedance is produced by the parasitic capacitance of switches such as transistors used to couple the resistive components in series. Coupling the resistive components in series between the termination voltage node and the pad shields the parasitic capacitances from the pad, thereby reducing the capacitive component of the impedance. As the series resistance between a parasitic capacitor and the pad approaches infinity, the contribution of the parasitic capacitor to the capacitive component of the impedance tends to zero.

Some embodiments of the resistive tuning circuit may control the variable resistive component by applying enabling signals to a subset of a plurality of transistors coupled between the plurality of resistive components and a termination voltage node such as ground or other voltage whose source impedance is low relative to a nominal termination value. Some embodiments of the resistive tuning circuit may be implemented in a transmitter including a termination circuit formed from a plurality of transistors of a first type to couple the plurality of resistive components to the termination voltage node and a plurality of transistors of a second type to couple the plurality of resistive components to the pad. The resistive component of the impedance may be established by applying a first set of enabling signals to the plurality of transistors of the first type and applying a second set of enabling signals to the plurality of transistors of the second type. For example, a first portion of the first set of enabling signals may be set to a logic-low level to disable one or more NMOS transistors and a corresponding first portion of the second set of enabling signals may be set to a logic-high level to disable one or more PMOS transistors. A binary data signal to be transmitted by the transmitter may be provided to a second portion of the first set of enabling signals and a corresponding second portion of the second set of enabling signals. The NMOS and PMOS transistors that received the second portion of the first and second sets of enabling signals may then drive the corresponding resistive components with an inverted binary data signal.

FIG. 1 is a block diagram of an integrated circuit 100 including a transmitter 105 and a receiver 110 in accordance with some embodiments. The transmitter 105 may be a processing device such as a central processing unit (CPU), a graphics processing unit (GPU), an accelerated processing unit (APU), a processor core, or other type of processing device. The transmitter 105 may also be a memory element, an input/output (I/O) circuit, or other circuit. Some embodiments of the transmitter 105 include one or more pads 115 (only one indicated by a reference numeral in the interest of clarity) that provide a conductive connection between internal circuitry in the transmitter 105 and circuitry external to the transmitter 105. The receiver 110 may also be a processing device, memory element, I/O circuit, or other circuit. Some embodiments of the receiver 110 include one or more pads 120 (only one indicated by a reference numeral in the interest of clarity) that provide a conductive connection between internal circuitry in the receiver 110 and circuitry external to the receiver 110.

The integrated circuit 100 also includes a wireline serial link 125. Some embodiments of the wireline serial link 125 may be formed using conductive traces, vias, wires, or other interconnections. The transmitter 105 is coupled to the wireline serial link 125 via the pad 115 and the receiver 110 is coupled to the wireline serial link 125 via the pad 120. The transmitter 105 may therefore transmit signals such as binary data signals to the receiver 110 over the wireline serial link 125. Some embodiments of the receiver 110 may include an equalizer 130 that is used to equalize signals received over the wireline serial link 125. For example, the equalizer 130 may be used to amplify some frequency bands in the signals received over the wireline serial link and to attenuate other frequency bands. Some embodiments of the transmitter 105 may also implement equalization functionality, either in addition to or instead of the equalizer 130 implemented in the receiver 110. Since the equalizer 130 may be implemented in the receiver 110, there may be little or no advantage to sharing components such as resistors or capacitors between the resistive tuning circuit 135 and the equalizer 130.

As discussed in greater detail herein, an impedance mismatch between the transmitter 105 and the receiver 110 may generate reflections that degrade the quality of the signals transmitted over the wireline serial link 125, which may lead to data loss, reduced speed, reduced throughput, or other errors. One measure of the reflected power and therefore the signal quality degradation is return loss, which may be defined as:

$$RL(dB) = 10\log_{10}\frac{P_i}{P_r},$$

where the return loss (RL) is measured in decibels (dB), $P_i$ is the incident power on the discontinuity, and $P_r$ is the reflected power from the discontinuity. The transmitter 105 includes a resistive tuning circuit 135 that can provide a variable resistive component of an output impedance of the transmitter 105. The variable resistive component may be adjusted to reduce or eliminate the impedance mismatch between the transmitter 105 and the receiver 110. Since at least a portion of the equalizer 130 may be implemented in the receiver 110, there may be little or no advantage to sharing components such as resistors or capacitors between the resistive tuning circuit 135 and the equalizer 130. Resistive components in the resistive tuning circuit 135 may therefore be implemented in series in some embodiments.

Some embodiments of the resistive tuning circuit 135 include a termination circuit (not shown in FIG. 1) that is formed of a plurality of resistors coupled in series with the pad 115 and a plurality of switches, which may be implemented as, for example, transistors. The switches are used to couple one or more of the resistors in series between the pad and a termination voltage node (e.g., ground) when the switch is closed. A configurable subset of the switches can be selectively closed to establish a resistive component of an impedance of the termination circuit, which may represent the resistive component of the output impedance of the transmitter 105 at the pad 115. For example, the resistive tuning circuit 135 may receive signals from other circuitry (not shown in FIG. 1) or feedback signals from the receiver 110 that may be used to determine an output impedance that reduces or eliminates the impedance mismatch between the transmitter 105 and the receiver 110. The subset of the switches may then be selected so that the resistive component of the output impedance of the transmitter 105 is approximately equal to the output impedance that reduces or eliminates the impedance mismatch.

Figure 2:
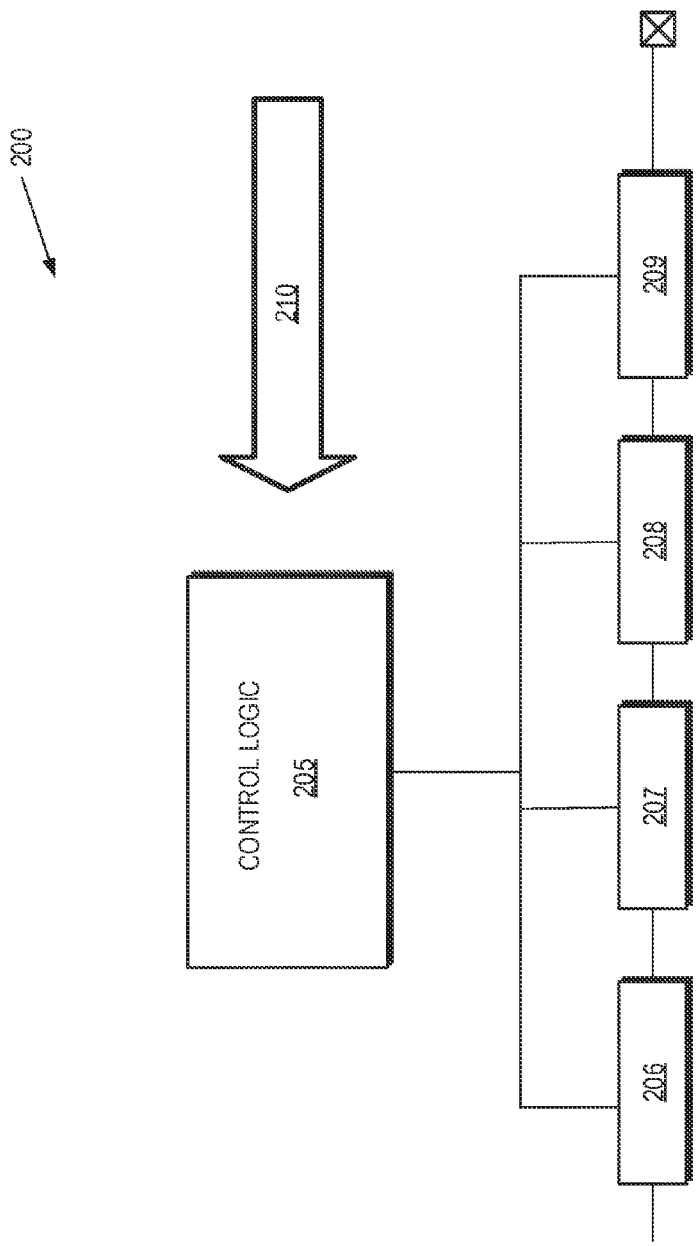
FIG. 2 is a circuit diagram of a termination circuit that may be implemented in the integrated circuit shown in FIG. 1 in accordance with some embodiments.

FIG. 2 is a circuit diagram of a resistive tuning circuit 200 that may be implemented in the integrated circuit 100 shown in FIG. 1 in accordance with some embodiments. The resistive tuning circuit 200 includes control logic 205 that is connected to resistive components 206, 207, 208, 209 (collectively, "resistive components 206-209") and can be used to selectively couple one or more of the resistive components 206-209 in series with a pad 210. The resistive components 206-209 include one or more resistors that can be coupled into the series circuit in response to signals provided by the control logic 205 using coupling circuitry such as switches or transistors, as described herein. Some embodiments of the control logic 205 may select a subset of the resistive components 206-209 to be coupled in series with the pad 210 based on input signals 215. For example, the input signals 215 may be generated based on feedback signals indicative of the impedance of a receiver (such as the receiver 110 shown in FIG. 1) or an impedance mismatch between a transmitter (such as the transmitter 105 shown in FIG. 1) and the receiver. For another example, the input signals 215 may be generated based on an off-chip resistor that can be compared to the resistance provided by the subset of resistive components 206-209 that are coupled in series with the pad 210.

Figure 3:
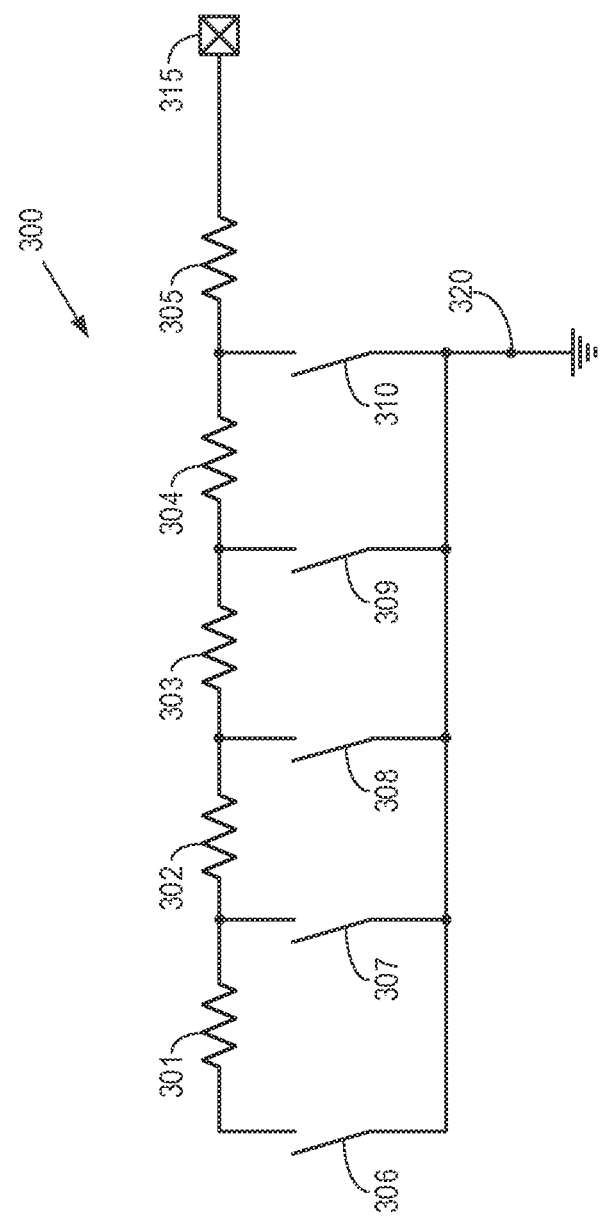
FIG. 3 is a circuit diagram of a termination circuit that may be implemented in the integrated circuit shown in FIG. 1 in accordance with some embodiments.

FIG. 3 is a circuit diagram of a termination circuit 300 that may be implemented in the integrated circuit 100 shown in FIG. 1 in accordance with some embodiments. The termination circuit 300 includes a plurality of resistive components 301, 302, 303, 304, and 305 (collectively, "resistive components 301-305") and a plurality of switches 306, 307, 308, 309, 310 (collectively, "switches 306-310"). The resistive components 301-305 can be selectively coupled in series between a pad 315 and a termination voltage node 320 by selectively closing some or all of the switches 306-310. For example, a controller such as the control logic 205 shown in FIG. 2 may implement a control scheme that selects a subset of the resistive component 301-305 and then provides signals that are used to selectively couple the subset in series between the pad 315 and the termination voltage node 320.

Some embodiments may use a "thermometer encoded" control scheme to determine which switches 306-310 should be closed. For example, if an impedance mismatch can be reduced or eliminated by an output impedance at the pad 315 provided by the resistive components 303-305, the thermometer-encoded control scheme may close the switches 306-308 so that the resistive components 303-305 are coupled in series between the pad 315 and the termination voltage node 320.

Some embodiments may use a "single switch" control scheme that closes a single one of the switches 306-310 to control the impedance. For example, if an impedance mismatch can be reduced or eliminated by an output impedance at the pad 315 provided by the resistive components 303-305, the single switch control scheme may close the switch 308 so that the resistive components 303-305 are coupled in series between the pad 315 and the termination voltage node 320. Implementing the single switch control scheme may require larger switches, e.g., the sizes of transistors used to implement the switches 306-310 in the single switch control scheme may be larger than the sizes of the transistors used to implement switches 306-310 in the thermometer encoded control scheme.

The termination circuit 300 may also be placed in a high-impedance state or mode by opening all the switches 306-310 so that none of the resistive components 301-305 are coupled in series between the pad 315 and the termination voltage node 320.

Figure 4:
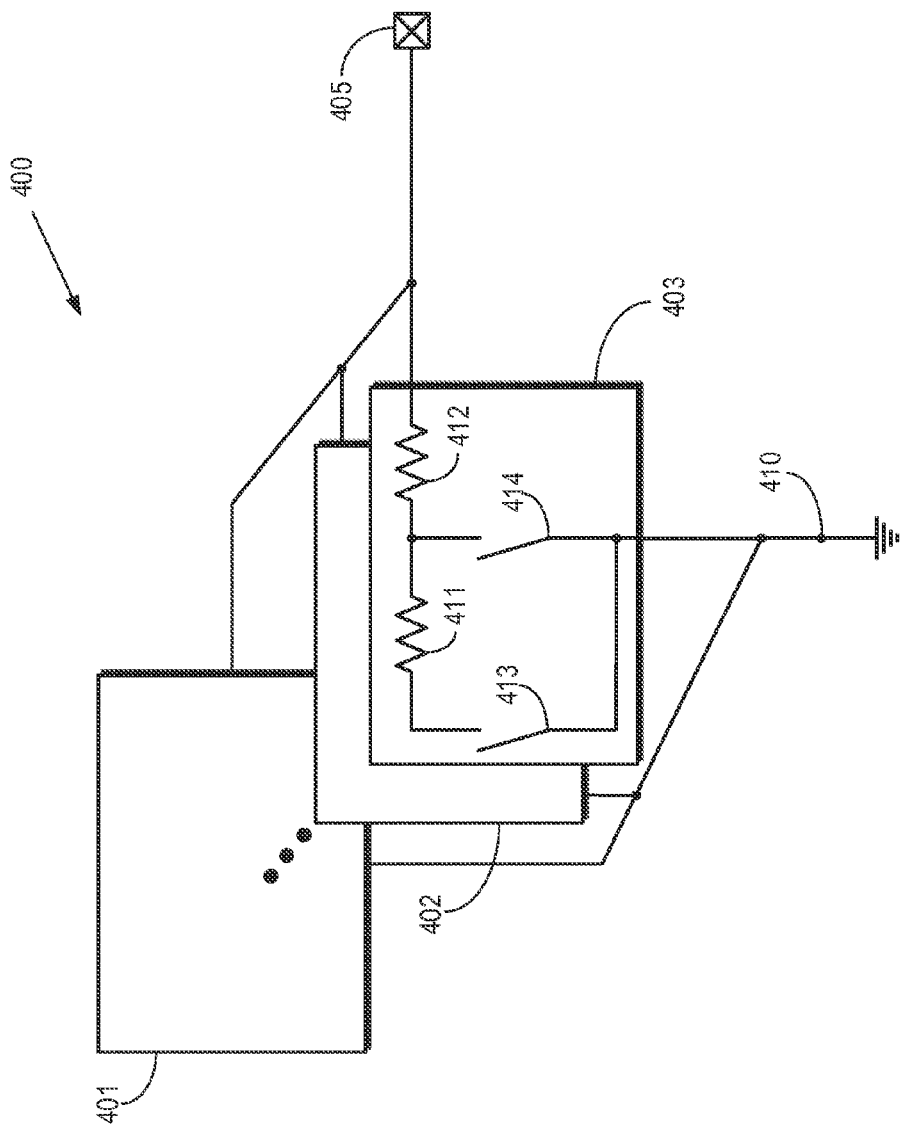
FIG. 4 is a circuit diagram of a termination circuit that may be implemented in the integrated circuit shown in FIG. 1 in accordance with some embodiments.

FIG. 4 is a circuit diagram of a termination circuit 400 that may be implemented in the integrated circuit 100 shown in FIG. 1 in accordance with some embodiments. The termination circuit 400 includes resistive components 401, 402, 403 (collectively, "resistive components 401-403") that are coupled in parallel between a pad 405 and a termination voltage node 410. Each of the resistive components 401-403 include a plurality of resistive components that can be selectively coupled in series between the pad 405 and the termination voltage node 410 to establish a resistive component of an impedance of the termination circuit 400. For example, the resistive component 403 includes resistive components 411, 412 that can be selectively coupled in series between the pad 405 and the termination voltage node 410 by closing one or more of the switches 413, 414. The termination circuit 400 may be referred to as a hybrid circuit because it includes both the resistive components 401-403 that are coupled in parallel between the pad 405 and the termination voltage node 410 and the resistive components 411, 412 that are coupled in series between the pad 405 and the termination voltage node 410. As discussed herein, a controller such as the control logic 205 shown in FIG. 2 may implement a control scheme that selects one or more of the resistors 411, 412 and then provides signals that are used to selectively couple the selected resistors in series between the pad 405 and the termination voltage node 410.

Figure 5:
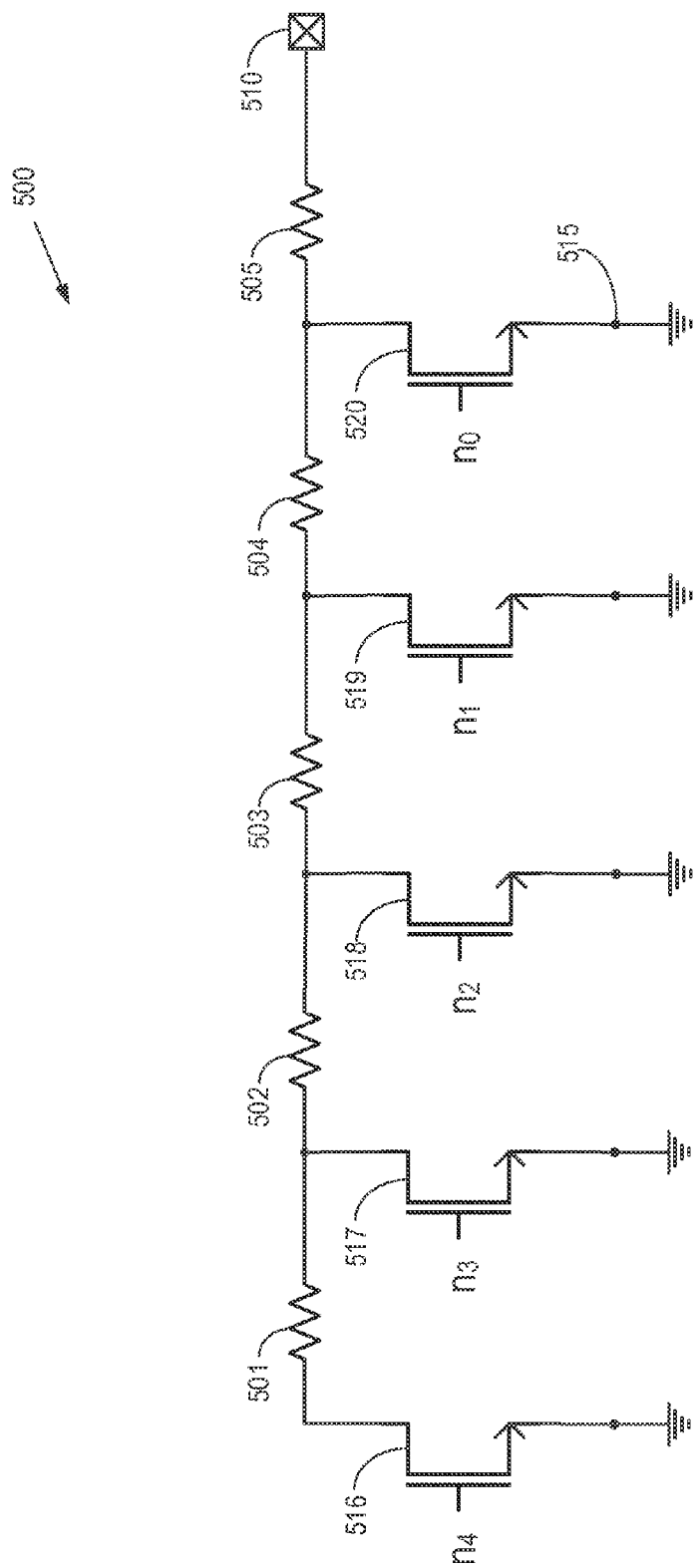
FIG. 5 is a circuit diagram of a termination circuit that may be implemented in the integrated circuit shown in FIG. 1 in accordance with some embodiments.

FIG. 5 is a circuit diagram of a termination circuit 500 that may be implemented in the integrated circuit 100 shown in FIG. 1 in accordance with some embodiments. The termination circuit 500 includes resistive components 501, 502, 503, 504, 505 (collectively, "resistive components 501-505") that may be coupled in series between a pad 510 and a termination voltage node 515 such as ground. The termination circuit 500 also includes transistors 516, 517, 518, 519, 520 (collectively, "transistors 516-520") that can be used to couple the resistive components 501-505 to the termination voltage node 515. The transistors 516-520 shown in FIG. 5 are NMOS transistors but some embodiments of the termination circuit 500 may use other types of transistors such as PMOS transistors. Signals $n_4$-$n_0$ can be applied to the gates of the transistors 516-520 to selectively turn on or turn off the transistors 516-520. For example, a logic-high signal (e.g., a signal corresponding to a logical 1) may be applied to the gate of the transistor 516 to turn on the transistor 516 so that it provides a conductive path to the termination voltage node 515. For another example, a logic-low signal (e.g., a signal corresponding to a logical 0) may be applied to the gate of the transistor 516 to turn off the transistor 516 to break or interrupt the conductive path to the termination voltage node 515.

A pattern of the signals $n_4$-$n_0$ can be used to selectively turn on/off one or more of the transistors 516-520 to establish an impedance of the termination circuit 500. For example, if the termination circuit 500 uses a thermometer encoded control scheme, the signals $n_4$-$n_0$ may be set to (1, 1, 0, 0, 0) to turn on the transistors 516-517 and to turn off the transistors 518-520. Once the transistors 516-517 are turned on to provide a conductive path to the termination voltage node 515, the resistive component 501 is in parallel with a short circuit and is effectively removed from the circuit. The resistive component of the impedance of the termination circuit 500 is therefore determined by the resistive components 502-505. The resistive components 502-505 shield the parasitic capacitance of the transistors 516-517 and the resistive components 503-505 shield the parasitic capacitance of disabled transistors 518-520, thereby reducing the capacitive component of the impedance of the termination circuit 500. For another example, if the termination circuit 500 uses a single switch control scheme, the signals $n_4$-$n_0$ may be set to (0, 1, 0, 0, 0) to turn on the transistor 517 and to turn off the transistors 516, 518-520. The resistive component 501 is substantially open-circuited by being in series with the open circuit formed by the disabled transistor 516, and is effectively removed from the circuit. Consequently, the resistive component of the impedance of the termination circuit 500 is determined by the resistive components 502-505. As discussed herein, a controller such as the control logic 205 shown in FIG. 2 may implement a control scheme that is used to generate the signals supplied to the transistors 516-520.

Figure 6:
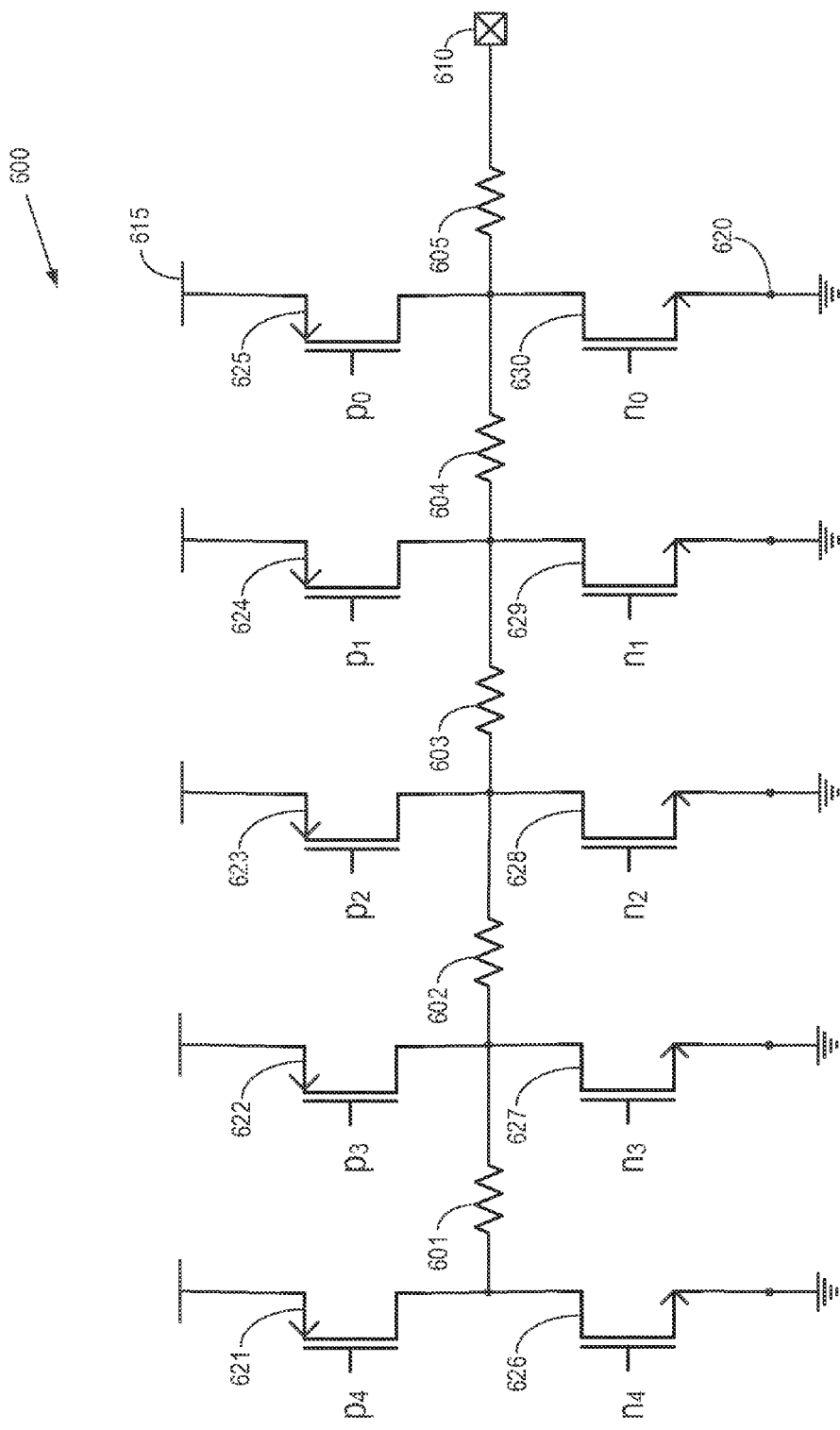
FIG. 6 is a circuit diagram of a termination circuit that may be implemented in the integrated circuit shown in FIG. 1 in accordance with some embodiments.

FIG. 6 is a circuit diagram of a termination circuit 600 that may be implemented in the integrated circuit 100 shown in FIG. 1 in accordance with some embodiments. The termination circuit 600 includes resistive components 601, 602, 603, 604, 605 (collectively, "resistive components 601-605") that may be coupled in series with a pad 610. The resistive components may also be coupled to a logic-high-voltage node 615 (only one indicated by a reference numeral in the interest of clarity) and a logic-low voltage node 620 (only one indicated by a reference numeral in the interest of clarity) such as ground. In some embodiments, the logic-high-voltage node 615 and the logic-low voltage node 620 may both be low impedance nodes and therefore the logic-high-voltage node 615 and the logic-low voltage node 620 may also be referred to as termination voltage nodes.

The termination circuit 600 also includes transistors 621, 622, 623, 624, 625 (collectively, "transistors 621-625") that can couple corresponding resistive components 601-605 to the logic-high voltage 615 and transistors 626, 627, 628, 629, 630 (collectively, "transistors 626-630") that can couple corresponding resistive components 601-605 to the logic-low voltage node 620. The transistors 621-625 may be of a different type than the transistors 626-630 so that each pair of transistors (e.g., the transistor pair 621, 626) forms an inverter to drive the corresponding resistive component (e.g., the resistive component 601). For example, the transistors 621-625 may be PMOS transistors and the transistors 626-630 may be NMOS transistors.

Some embodiments of the termination circuit 600 may be implemented in a transmitter such as the transmitter 105 shown in FIG. 1. For example, the termination circuit 600 may be used to provide binary data signals to the pad 610 for transmission over a wireline serial link such as the wireline serial link 125 shown in FIG. 1. The transistors 621-630 may be selectively enabled or disabled to establish a resistive component of the output impedance of the termination circuit 600 during transmission of the binary data signals. For example, if the termination circuit 600 uses a thermometer-encoded control scheme, the transistors 623-625 and 628-630 may be disabled by providing the signals $p_{2-0}=1$, and $n_{2-0}=0$, respectively. The binary data signals may then be provided to the gates of the transistors 621-622 and 626-627 (e.g., as the signals $p_{4-3}$ and $n_{4-3}$) so that the pad 610 receives an inverted binary data signal. The resistive component of the impedance may be determined by the series resistive components 602-605. The series resistive components 602-605 may shield the parasitic capacitances of the transistors 621-622 and 626-627. The series resistive components 603-605 may also shield the parasitic capacitances of the transistors 623-625 and 628-630. As discussed herein, a controller such as the control logic 205 shown in FIG. 2 may implement a control scheme that is used to generate the signals supplied to the transistors 621-625 and 626-630.

In some embodiments, the apparatus and techniques described above are implemented in a system comprising one or more integrated circuit (IC) devices (also referred to as integrated circuit packages or microchips), such as the termination circuit described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireline network (e.g., network accessible storage (NAS)).

Figure 7:
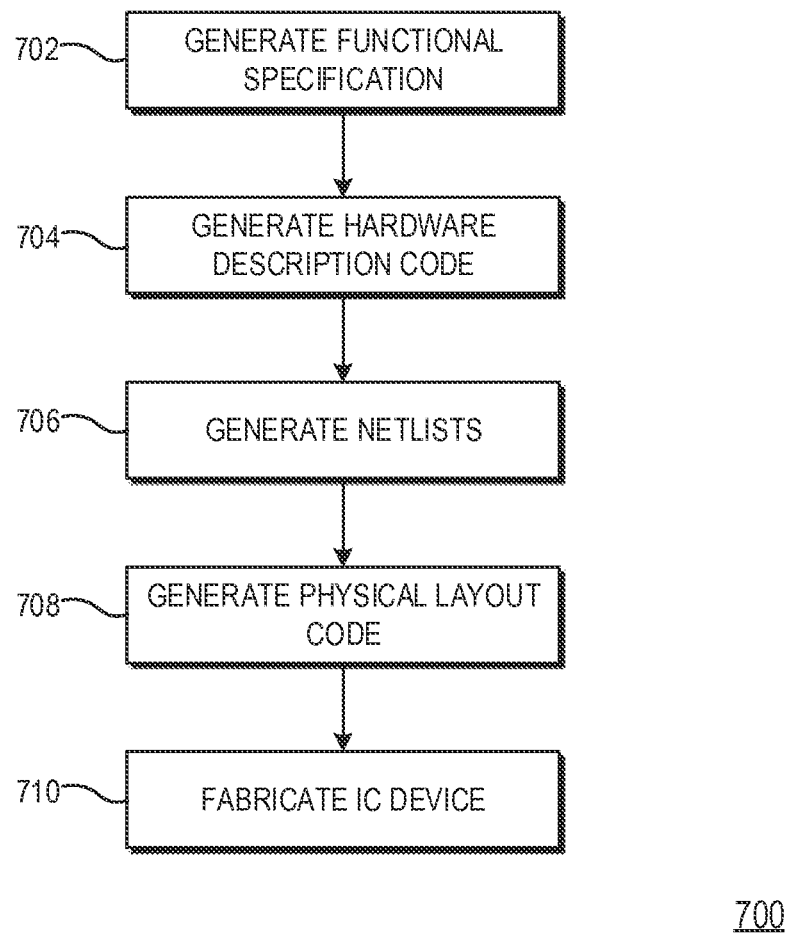
FIG. 7 is a flow diagram illustrating a method for designing and fabricating an integrated circuit device in accordance with some embodiments.

FIG. 7 is a flow diagram illustrating an example method 700 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 702 a functional specification for the IC device is generated. The functional specification (often referred to as a micro architecture specification (MAS)) may be represented by any of a variety of programming languages or modeling languages, including C, C++, SystemC, Simulink, or MATLAB.

At block 704, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 706 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 708, one or more EDA tools use the netlists produced at block 706 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist (s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 710, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
   a pad for coupling to a wireline serial link; and
   a termination circuit comprising:
      a plurality of resistive components; and
      a plurality of switches, wherein each switch is to couple one of the plurality of resistive components in series between the pad and a termination voltage node when the switch is closed, wherein the plurality of resistive components are coupled in series with each other and the pad when the plurality of switches are open, and wherein a first subset of the plurality of switches can be selectively closed to establish a corresponding resistive component of an impedance of the termination circuit, wherein the first subset of the plurality of switches is selectively closed using a thermometer encoded control scheme to selectively close the first subset of the plurality of switches to couple a first subset of the plurality of resistive components in parallel between the pad and the termination voltage node, and wherein a second subset including more than one of the plurality of switches is selectively opened so that more than one of the plurality of resistive components are coupled in series between the pad and the termination voltage node.

2. The apparatus of claim 1, wherein the plurality of switches comprise a plurality of first transistors.

3. The apparatus of claim 2, wherein the apparatus is a receiver to receive binary data signals transmitted over the wireline serial link, and wherein the plurality of first transistors can be selectively turned on to provide one or more conductive paths between the termination voltage node and the pad.

4. The apparatus of claim 3, wherein a subset of the plurality of first transistors are selectively turned on to establish the resistive component of the impedance of the termination circuit.

5. The apparatus of claim 2, wherein the apparatus comprises a transmitter to transmit binary data signals over the wireline serial link, and wherein the apparatus further comprises a plurality of second transistors of a second type that is different than a first type of the first transistors, and wherein each second transistor couples a corresponding one of the plurality of resistive components to a logic-high voltage node.

6. The apparatus of claim 5, wherein the binary data signals are selectively applied to a subset of transistor pairs selected to establish the resistive component of the impedance of the termination circuit.

7. The apparatus of claim 5, wherein the plurality of first transistors are NMOS transistors and wherein the plurality of second transistors are PMOS transistors.

8. The apparatus of claim 1, comprising a plurality of termination circuits coupled in parallel between the pad and the termination voltage node.

9. A system comprising:
   a wireline serial link; and
   a transmitter coupled to the wireline serial link, wherein the transmitter comprises a resistive tuning circuit comprising:
      a plurality of resistive components; and
      a plurality of switches, wherein each switch is to couple one of the plurality of resistive components in series between a pad coupled to the wireline serial link a termination voltage node when the switch is closed, wherein the plurality of resistive components are coupled in series with each other and the pad when the plurality of switches are open, and wherein a first subset of the plurality of switches can be selectively closed to establish a resistive component of an impedance of the resistive tuning circuit, wherein the first subset of the plurality of switches is selectively closed using a thermometer encoded control scheme to selectively close a first subset of the plurality of switches to couple a first subset of the plurality of resistive components in parallel between the pad and the termination voltage node, and wherein a second subset including more than one of the plurality of switches is selectively opened so that more than one of the plurality of resistive components are coupled in series between the pad and the termination voltage node.

10. The system of claim 9, wherein the transmitter further comprises a plurality of first transistors of a first type to couple the plurality of resistive components in series between the pad and a termination voltage node reference and a plurality of second transistors of a second type different than the first type, and wherein each second transistor couples a corresponding subset of at least one of the plurality of resistive components to a logic-high voltage reference.

11. The system of claim 10, wherein transistor pairs comprised of one of the plurality of first transistors and one of the plurality of second transistors each forms an inverter having an output coupled to a corresponding one of the plurality of resistive components.

12. The system of claim 11, wherein binary data signals are selectively applied to a subset of the transistor pairs for transmission over the wireline serial link, the subset being selected to match the resistive component of the impedance of the transmitter to a resistive component of an impedance of a receiver.

13. The system of claim 10, wherein the plurality of first transistors are NMOS transistors and wherein the plurality of second transistors are PMOS transistors.

14. The system of claim 9, comprising a plurality of termination circuits coupled in parallel between the pad and the termination voltage node.

15. The system of claim 9, comprising a receiver coupled to the wireline serial link.

16. The system of claim 15, wherein the receiver comprises an equalizer for equalizing signals received over the wireline serial link.

17. A non-transitory computer readable storage medium embodying a set of executable instructions, the set of executable instructions to manipulate a computer system to perform a portion of a process to fabricate at least part of an integrated circuit, the integrated circuit comprising:
a pad for coupling to a wireline serial link; and
a termination circuit comprising:
a plurality of resistive components; and
a plurality of switches, wherein each switch is to couple one of the plurality of resistive components in series between the pad and a termination voltage node when the switch is closed, wherein the plurality of resistive components are coupled in series with each other and the pad when the plurality of switches are open, wherein a first subset of the plurality of switches can be selectively closed to establish a corresponding resistive component of an impedance of the termination circuit, wherein the first subset of the plurality of switches is selectively closed using a thermometer encoded control scheme to selectively close the first subset of the plurality of switches to couple a first subset of the plurality of resistive components in parallel between the pad and the termination voltage node, and wherein a second subset including more than one of the plurality of switches is selectively opened so that more than one of the plurality of resistive components are coupled in series between the pad and the termination voltage node.

18. The non-transitory computer readable storage medium of claim 17, further embodying a set of executable instructions to manipulate the computer system to perform a portion of a process to fabricate an integrated circuit, the integrated circuit further comprising:
a plurality of first transistors of a first type to couple the plurality of resistive components in series between the pad and a termination voltage node and a plurality of second transistors of a second type that is different than the first type, and wherein each second transistor couples a corresponding one of the plurality of resistive components to a logic-high voltage node.

19. The non-transitory computer readable storage medium of claim 17, further embodying a set of executable instructions to manipulate the computer system to perform a portion of a process to fabricate an integrated circuit, the integrated circuit further comprising:
the wireline serial link; and
a receiver coupled to the wireline serial link.

20. The apparatus of claim 1, wherein each of the plurality of resistive components comprises a plurality of less resistive components connected in series.

* * * * *